United States Patent [19]

Eastman

[11] 4,452,978

[45] Jun. 5, 1984

[54] GRANULAR STARCH ETHERS HAVING REDUCED PASTING TEMPERATURES

[75] Inventor: James E. Eastman, Decatur, Ill.

[73] Assignee: A. E. Staley Manufacturing Company, Decatur, Ill.

[21] Appl. No.: 443,078

[22] Filed: Nov. 19, 1982

[51] Int. Cl.$^3$ .............................................. C08B 31/08
[52] U.S. Cl. .................................... 536/111; 426/549; 426/578
[58] Field of Search .......................................... 536/111

[56] References Cited

U.S. PATENT DOCUMENTS

| | | | |
|---|---|---|---|
| 2,516,632 | 7/1950 | Kesler et al. | 536/111 |
| 2,516,633 | 7/1950 | Kesler et al. | 536/111 |
| 2,516,634 | 7/1950 | Kesler et al. | 536/111 |
| 2,682,535 | 6/1954 | Broderick | 536/111 |
| 2,744,894 | 5/1956 | Benedict et al. | 536/111 |
| 2,845,417 | 7/1958 | Kesler et al. | 536/111 |
| 2,996,498 | 8/1961 | Jarowenko | 536/111 |
| 3,014,901 | 12/1961 | Gill et al. | 536/111 |
| 3,127,392 | 3/1964 | Fisher et al. | 536/111 |
| 3,135,739 | 6/1964 | Hjermstad et al. | 536/111 |
| 3,637,656 | 1/1972 | Germino et al. | 536/111 |
| 3,725,386 | 4/1973 | Hanson et al. | 536/111 |
| 3,966,990 | 6/1976 | Cremer et al. | 536/111 |
| 4,015,067 | 3/1977 | Liu et al. | 536/96 |
| 4,112,222 | 9/1978 | Jarowenko | 536/111 |

*Primary Examiner*—Ronald W. Griffin
*Attorney, Agent, or Firm*—Steven R. Lammert; Philip L. Bateman; Forrest L. Collins

[57] ABSTRACT

Hydroxypropylation of granular starch in a liquid medium comprising a lower alkanol under alkaline conditions in a confined zone at high temperature provides a novel improved hydroxypropyl substituted granular starch having a pasting temperature reduced from that of the granular starch before hydroxypropyl substitution by at least 6.5° C. for each 1% by weight of hydroxypropyl substitution.

26 Claims, 1 Drawing Figure

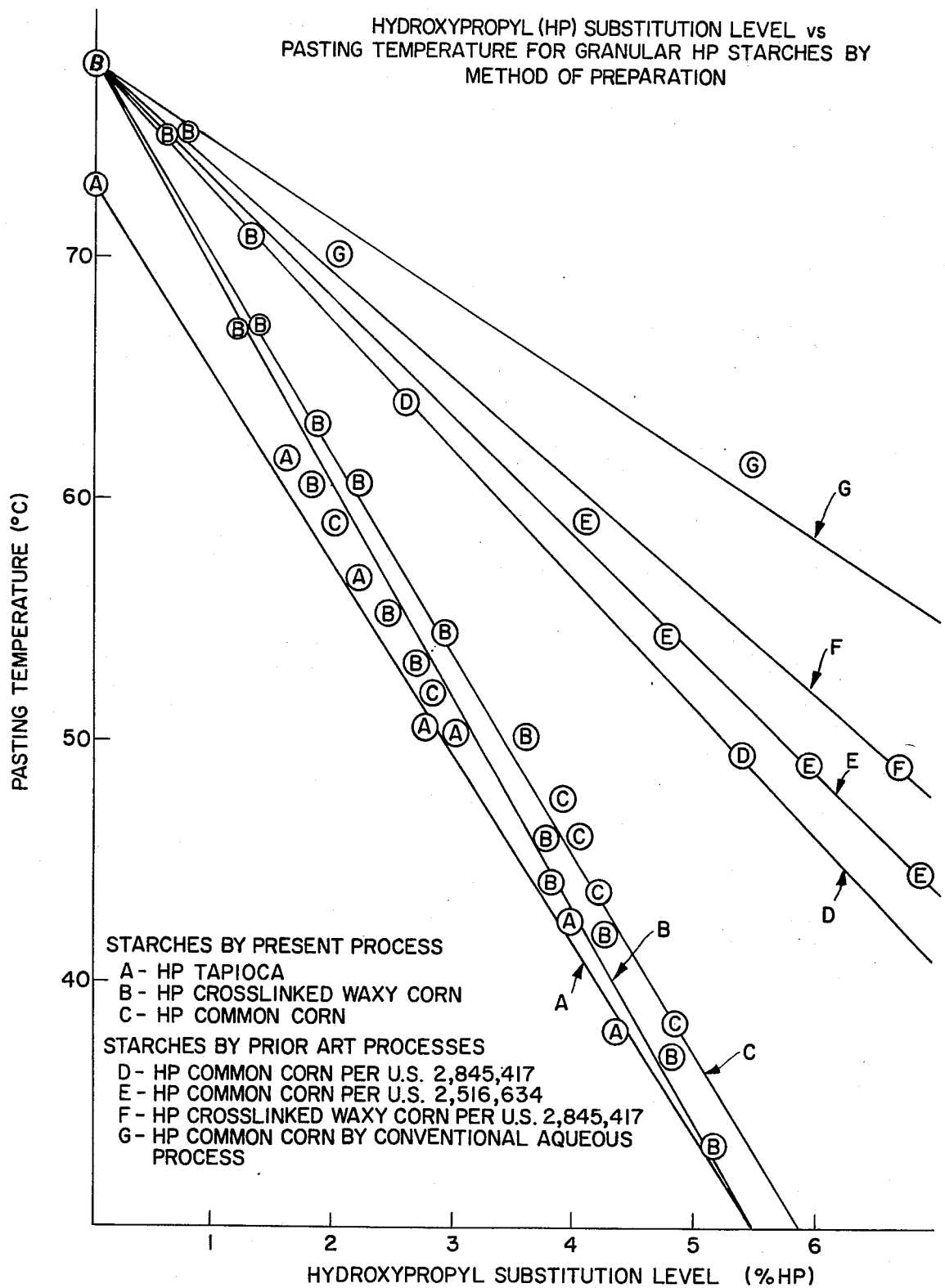

GRANULAR STARCH ETHERS HAVING REDUCED PASTING TEMPERATURES

BACKGROUND AND SUMMARY OF THE INVENTION

This invention relates to novel hydroxypropyl substituted granular starch materials having a pasting temperature reduced from that of the granular starches before hydroxypropyl substitution. The pasting temperature of the present starch materials is substantially below the pasting temperature of hydroxypropyl substituted granular starches, having like levels of hydroxypropyl substitution, which are known in the art.

It is well known in the art that granular starch materials can be chemically modified by reaction with alkylene oxides and alkyl halides to provide granular starch ethers characterized by pasting temperatures below that of the parent unmodified granular starch. Indeed by controlling the amount of hydroxyalkylating agent and the conditions of reaction the skilled practitioner can prepare etherified granular starch materials having a pasting temperature ranging from just below the pasting temperature of the parent unmodified granular starch to just above the freezing point of water. Typically the greater the degree of substitution (hydroxyalkylation) the greater the observed reduction in pasting temperature of the hydroxyalkylated modified granular starch.

Hydroxyalkyl starch ethers are prepared commonly by the reaction of granular starch materials with ethylene oxide, propylene oxide or epichlorohydrin preferably in the presence of an alkali metal hydroxide catalyst. That reaction has been conducted under a wide variety of process conditions under which the hydroxyalkylated starch product material remains in its native ungelatinized granular form. In that form it is easily dewatered and washed and thus economically produced in a relatively pure state.

The selection of reaction conditions for conducting hydroxyalkylation of granular starches is based somewhat on the level of hydroxyalkyl substitution desired in the product starch material. Where a degree of substitution (D.S.) of up to about 0.1 hydroxyalkyl groups per anhydroglucose unit in the starch polymer is desired, a conventional aqueous reaction process can be employed. This is the process most widely used commercially for the production of reduced pasting temperature hydroxyalkylated starches in the United States. In the aqueous process, granular starch in a 40 to 45% solids suspension is made alkaline with an alkali metal hydroxide or alkaline earth metal hydroxide; ethylene or propylene oxide is added to the suspension. The reaction is conducted at temperatures well below the swelling temperature of the starch usually not exceeding 50° C. Often swelling inhibitors such as neutral alkali metal salts or water miscible organic solvents are added to the reaction mixture to prevent the swelling of the granular starch material under the alkaline reaction conditions. The alkali is added to the reaction mixture to promote efficient and rapid reaction of the starch with the alkylene oxide reagents. U.S. Pat. No. 2,516,633 describes such a process for reacting unswollen granular starch under non-swelling conditions with an alkylene oxide in a water solution of a water soluble alkali metal or alkaline earth metal salt.

As alluded to hereinabove, because of granular swelling, it is difficult to prepare ungelatinized, hydroxyalkyl substituted starch products containing more than about 0.1 hydroxyalkyl groups per glucose unit when reactions are conducted in water suspensions. In order to obtain higher degrees of substitution, it is necessary to conduct the etherification in the presence of a limited amount of moisture. Such has been accomplished by reaction either in the absence of a liquid reaction medium (dry state) or in a liquid such as a lower aliphatic alcohol which has little or no tendency to swell the product hydroxyalkyl starch ethers. There are a number of U.S. patents directed to starch hydroxyalkylation processes which eliminate or at least minimize the exposure of the product hydroxyalkyl starches to moisture thereby facilitating isolation of higher-substituted hydroxyalkyl starches.

U.S. Pat. Nos. 2,516,632 and 2,516,634 each describe a process which involves the reaction of alkylene oxide in the gaseous form with ungelatinized granular starch material. The U.S. Pat. No. 2,516,632 describes the direct reaction of gaseous alkylene oxides with granular starch by agitating a mixture thereof in a closed vessel until substantially no free alkylene oxide remains. The U.S. Pat. No. 2,516,634 describes a similar process except a soluble alkali metal salt is first dispersed in the granular starch prior to bringing the starch into contact with the reactive alkylene oxide.

There is also a substantial number of patents which disclose the hydroxyalkylation of granular ungelatinized starch in substantially non-aqueous liquid media in the presence of alkaline catalyst. U.S. Pat. No. 2,682,535 describes a process for producing a hydroxyalkyl ether of a polysaccharide, including celluloses and starches, by reacting polysaccharide with an alkylene oxide in the presence of caustic alkali in a mixture of a $C_{4-10}$ monohydric alkanol and a 2-($C_{1-4}$ alkoxy)isopropanol at a temperature no higher than 50° C. U.S. Pat. No. 2,744,894 discloses a similar process wherein the liquid phase of the reaction medium is comprised of a mixture of a high boiling (85° C.+) organic liquid and a $C_{1-4}$ alkoxy ethanol or $C_{1-4}$ alkoxyisopropanol.

U.S. Pat. No. 3,127,392 discloses a process for preparing hydroxyalkyl amylose by reacting amylose with an alkylene oxide under alkaline conditions in a polar solvent including water and alcohols at temperatures between 30° C. and 90° C. for approximately 1 to 24 hours. U.S. Pat. No. 3,135,739 describes a process for preparing a highly substituted starch ether in the granular ungelatinized state by reacting moist alkaline granular starch in an aliphatic ketone with an alkylene oxide until the starch contains in excess of 0.5 ether groups per anhydroglucose unit. The starch products from that process swell in cold water.

U.S. Pat. No. 3,014,901 also describes a process for preparing ungelatinized ethers wherein the granular starch is first reacted with an "inhibiting amount" of epichlorohydrin and thereafter with ethylene oxide in an aqueous alkaline slurry until the degree of substitution of the granular starch product lies within the range of 0.15 to 0.55.

U.S. Pat. No. 2,845,417 discloses the process for preparing ungelatinized hydroxyalkyl derivatives of granular starch which comprises forming a slurry of granular starch in water, a water miscible alcohol, and an alcohol soluble alkali, and then reacting the granular starch in said slurry with a hydroxyalkylating agent to provide a partially etherified ungelatinized product in filterable form. The reaction is conducted at a temperature between about 60° and 130° F. for a period of up to about 24 hours. Under the processing conditions therein disclosed, the amount of hydroxyalkylating agent may be adjusted to give products which will swell or gelatinize in water at any desired temperature between the normal gelatinization temperature of the granular starch and the freezing point of water.

U.S. Pat. No. 4,015,067 also describes a hydroxyalkylation process and focuses on the preparation of cellulose-polysaccharide ethers by (1) preparing a slurry of cellulose, alkali metal hydroxide, and an etherifying ingredient with or without an inert carrier fluid (including an excess of alkyl chloride, dimethyl ether, hexane, benzene or toluene) in the substantial absence of free oxygen; (2) feeding the slurry into a heated tubular reactor at a pressure of about 100 to about 400 psig at a rate to provide a reaction period of 10 to 60 minutes at 30° to 135° C.; and (3) recovering the polysaccharide ether from the slurry.

In sum the prior art describes essentially three general types of processing conditions for the preparation of hydroxyalkyl granular starch ethers by the reaction of granular starch and alkylene oxides:

(1) In an aqueous medium in the presence of an alkali metal hydroxide base and optionally in the presence of swelling-suppressing salts;

(2) In the absence of any reaction medium, that is, the direct reaction of alkylene oxide in the gaseous or liquid state with a granular starch material, optionally in the presence of an alkali metal hydroxide or alkali metal salt; or (3) In a substantially non-aqueous, alkaline medium.

Those skilled in the art will appreciate that regardless of which method is used for the preparation of hydroxyalkyl starch ethers, generally there is a direct relationship between the level of hydroxyalkyl substitution and the observed reduction in pasting temperature; the higher the level of hydroxyalkyl substitution the lower the pasting temperature exhibited by the modified granular starch. The pasting temperature exhibited by hydroxypropyl substituted starches is typically reduced from the pasting temperature of the unmodified starch by about 2° up to about 5° C. for each 1% by weight of hydroxypropyl content (or for each 0.025 D.S.).

Because of their reduced pasting temperature, hydroxypropyl substituted granular starches find broad application as thickeners in quick-cooking food formulations such as gravies, sauces, pie fillings, etc. Those skilled in the art will recognize the inherent advantage which would be realized by a hydroxypropylated, low-pasting-starch having a degree of substitution (D.S. hydroxypropyl) substantially lower than that of presently available hydroxypropylated food starches of similar pasting temperatures. Not only would the cost of hydroxypropylating agent be reduced, but also there would be inherent advantage perceived by the consumer in minimizing the level of chemical modification of starch ingredients in the many starch containing food compositions which are included in the consumer's diet.

Accordingly it is an object of the present invention to provide hydroxypropylated reduced pasting-temperature food starches which have a pasting temperature characteristic of conventional hydroxypropylated starches having much higher levels of hydroxypropyl substitution.

It is a further object of this invention to provide novel granular starch products which have gelatinization temperatures ranging from that of cold water, that is, about 50° F. (10° C.), to temperatures within about 10° of the pasting temperature of the parent unsubstituted granular starch with hydroxypropyl substitution levels as little as one-half the levels normally required to achieve equal reductions in pasting temperature.

Another object is to provide a process for the preparation of novel hydroxypropylated granular starches which exhibit a pasting temperature reduced from that of the granular starch before hydroxypropylation by at least 6.5° C. for each 1% by weight hydroxypropyl substitution.

The above and related objects are achieved in the present invention by an improved hydroxypropyl substituted granular starch prepared by reacting granular starch in a lower alkanol with propylene oxide under alkaline conditions at high temperatures, that is, temperatures above 100° C. The hydroxypropylated granular starch products in accordance with this invention exhibit unexpectedly low pasting temperatures at hydroxypropyl substitution levels between about 2 and about 9% by weight of the starch. The present improved hydroxypropyl substituted granular starch can be used as a thickening agent in foods or food ingredients which require the functionality of a reduced-pasting-temperature granular starch component.

DESCRIPTION OF THE DRAWING

FIG. 1 is a graphic presentation of the relationship of hydroxypropyl substitution level and pasting temperature in the present granular hydroxypropylated starches and in granular hydroxypropylated starches prepared by conventional hydroxypropylation procedures.

DETAILED DESCRIPTION OF THE INVENTION

The present invention is directed to an improved hydroxypropyl substituted granular starch, optionally crosslinked, which is characterized by (1) a hydroxypropyl substitution level of about 2 to about 9% weight of the starch, dry solids basis (dsb), and (2) a pasting temperature reduced from that of the granular starch before hydroxypropyl substitution by at least 6.5° C. for each 1% by weight of hydroxypropyl substitution. Expressed alternatively in terms of degree of substitution (D.S.) the improved hydroxypropyl substituted granular starch of this invention is characterized by a D.S. of about 0.06 to about 0.27 and pasting temperature reduced from that of the granular starch before hydroxypropyl substitution by at least about 2.2° C. for each incremental 0.01 D.S. hydroxypropyl. The low-pasting-temperature granular starch products of this invention are thus characterized by an unusually large depression in pasting temperature (from that of the unmodified granular starch) when compared to art-recognized reduced pasting temperature hydroxypropylated granular starches of equal or similar hydroxypropyl substitution levels.

The present invention is based on applicant's discovery that the efficiency of hydroxypropyl substitution of granular starch in reducing the pasting temperature of granular starch can be enhanced significantly by conducting the hydroxypropylation reaction in lower alkanols containing effective but relatively low amounts of water under alkaline conditions at temperatures in excess of about 100° C.

The drawing (FIG. 1) presents a graphic comparison of the relationship between pasting temperature and hydroxypropyl substitution level of the present hydroxypropylated starches, prepared in accordance with the process embodiment of this invention, with the pasting temperature/hydroxypropyl substitution level relationship exhibited by hydroxypropylated granular starches prepared from the same varieties of ungelatinized starch starting materials using each of three conventional hydroxypropylation procedures. The circled data points A, B, and C each represent the pasting temperature for tapioca, cross-linked waxy corn, and common corn starches respectively which have been hydroxypropylated in accordance with the present processing conditions to the indicated hydroxypropyl substitution level (% HP). The lines designated A, B, and C each represent applicant's interpretation of the best fit for the corresponding circled-letter data points. While applicant may have taken some liberty in assuming a straight line relationship in the plot of pasting temperature versus %HP, applicant believes that designation is warranted by the readily apparent close fit of the circled-letter data points and the corresponding letter-designated lines. It is evident from FIG. 1. that each of the hydroxypropylated (HP) starches prepared in accordance with the present process, having a hydroxypropyl substitution level in excess of about 2% HP exhibit a pasting temperature reduced from that of the granular starch before hydroxypropyl substitution of greater than 6.5° C. for each 1% HP. Indeed the data represented by the lines A, B and C in FIG. 1 represent a pasting temperature reduction of between about 7.5° and 9° C. for each 1% by weight of hydroxypropyl substitution.

The circled data points D, E, F, and G in FIG. 1 show the relationship between the pasting temperature and hydroxypropyl substitution level of HP cross-linked waxy corn and HP common corn granular starch (the same starting material used for the present HP starches represented by circled points B and C) which were prepared using representative prior art hydroxypropylation procedures. Circled points D and F represent the measured pasting temperature and % HP for hydroxypropylated common corn starch and cross-linked waxy corn starch, respectively, prepared in accordance with the hydroxypropylation process and procedures disclosed in U.S. Pat. No. 2,845,417. That patent describes hydroxypropylation conditions quite similar to those utilized in the present process except it is conducted at a substantially lower temperature.)

The hydroxypropylated granular corn starch products represented by circled data points E on the graph in FIG. 1 were prepared by the procedures disclosed in U.S. Pat. No. 2,516,634 wherein granular starch is reacted with gaseous or liquid propylene oxide in the presence of an alkali metal salt and in the absence of any other liquid medium. Circled data points G represent the measured pasting temperature and hydroxypropyl substitution level of hydroxypropylated common corn starch prepared using the conventional aqueous process wherein the granular starch is reacted with propylene oxide in an aqueous alkaline medium. The lines on the graph designated D, E, F, and G have been drawn (again assuming a substantially straight line relationship between pasting temperature and H.P. substitution level) to best fit the corresponding circled data points including the pasting temperature of the granular starch before hydroxypropylation.

The greatest depression in pasting temperature per percent hydroxypropyl substitution in the hydroxypropylated starches prepared by the art-recognized hydroxypropylation procedures was seen in the hydroxypropylated common corn starch prepared in accordance with the procedure of U.S. Pat. No. 2,845,417 (starch reaction with propylene oxide in alkaline alcohol medium at 130° F.). The pasting temperature data obtained on those hydroxypropylated starches and represented by line D in FIG. 1 reflect a reduction in pasting temperature of slightly more than 5° C. for each one percent HP.

It is readily apparent from the graphic presentation of data in FIG. 1 that the pasting temperature reduction per unit hydroxypropyl substitution is dramatically increased in the HP starches of the present invention. For example, the starches of the present invention substituted at the 4 to 5% HP level have pasting temperatures ranging from about 10° to about 15° lower than hydroxypropylated starches having similar substitution levels, but prepared in accordance with art-recognized procedures. Stated alternatively the hydroxypropyl substitution levels required in the present hydroxypropylated starches to effect reduced pasting temperatures of about 60° C. and below are about one-half to three-fourths of those substitution levels required in hydroxypropylated granular starches of the prior art to achieve like reductions in pasting temperature. From the graph it is also apparent that differences between the present hydroxypropylated starches and those prepared by art-recognized procedures are not so significant below the 2% HP substitution level.

The novel reduced-pasting-temperature granular starches of the present invention are thus characterized by a high ratio of reduction in pasting temperature to the level of hydroxypropyl (HP) substitution. The hydroxypropyl substitution level used in characterizing the present reduced-pasting-temperature starches is determined by a method which measures the glucose produced by acid hydrolysis of the hydroxylated starch. Any material present in the sample which is not converted to beta-d-glucose by acid hydrolysis will be measured as hydroxypropyl substituted. The beta-d-glucose which is liberated by acid hydrolysis of the hydroxypropylated starch material is converted by the specific catalytic action of glucose oxidase to hydrogen peroxide which when reacted with potassium ferrocyanide in the presence of horseradish peroxidase yields the oxidized ferricyanide ion. The peroxide reactions are performed in a pH 7 buffered system to minimize amylase and maltase activity. The absorbence of the resulting ferricyanide solution is measured at 420 nm during passage through a flow cell on an Auto-Analyzer. A more detailed description of the method used for determining hydroxypropyl substitution level in the present starches is provided in the introduction to the Preparations and Examples below.

The pasting temperature values used in characterizing the present low-pasting-temperature starch materials is determined using a Brabender VISCO/AMYLO/-GRAPH. That instrument records changes in viscosity of starch suspensions on heating and cooling. In general, the starch material under test is introduced in a water suspension into a rotating sample bowl which is driven at a constant speed. The sample bowl is positioned in an electrically heated air bath and a cold finger projects into the bowl. A circular metal disc with several metal pins projecting vertically downward into the sample serves as the sensing element. The starch suspension is then heated by a mechanically operated thermo-regulator which increases the temperature of the suspension at a constant rate of 1.5° C. per minute. The pasting temperature of the present hydroxypropylated reduced-pasting-temperature starch materials is that temperature at which the pen of the instrument leaves the "Zero Brabender Unit" line on the recording chart. Additional details of the method for determining the pasting temperatures used in characterizing the present low-pasting-temperature starches is provided hereinbelow.

The reduced pasting temperature starches of the present invention are prepared by reacting ungelatinized granular starch with propylene oxide in a liquid medium comprised of a $C_1$–$C_3$ alkanol and water under alkaline conditions at reaction temperatures in excess of about 100° C. and with reaction times ranging from less than 1 minute to about 1 hour.

Ungelatinized granular starch material from which the present reduced-pasting-temperature starches are prepared according to the process embodiment of this invention can be selected from a wide variety of plant sources including corn, potato, wheat, rice, waxy maize, tapioca, etc. The term "ungelatinized starch" refers to starch which has not been subjected to granule fragmenting process conditions and which therefore consists essentially of whole unfragmented granules. The starch starting materials for the present process can be unmodified or chemically modified in a manner which does not destroy the granular structure of the starch. Thus the ungelatinized granular starch starting materials for the present process include unmodified starches, acid modified thin-boiling starches, bleached starches, starches which have been cross-linked with multifunctional starch cross-linking agents such as phosphorus oxychloride, sodium trimetaphosphate, acrolein or epichlorohydrin, or starches which have been substituted to varying degrees with, for example, other art-recognized esterifying agents. Preferred starch starting materials for the present reduced pasting temperature starch material include unmodified starches selected from tapioca, corn and waxy maize, and those same starches which have been cross-linked using multifunctional esterifying or etherifying agents. An ungelatinized cross-linked waxy maize starch is a preferred starting starch material for the present invention. Cross-linked reduced-pasting-temperature starches in accordance with this invention exhibit greater viscosity and freeze-thaw stability than do those starches of the present invention which are not cross-linked. Cross-linking can be accomplished before or after starch hydroxypropylation by the present process.

The process embodiment of the present invention for preparing the present reduced-pasting-temperature granular starches can be carried out as a batch-type process or as a continuous process.

In either instance the first step for preparing the present reduced-pasting-temperature starches is the preparation of a reaction slurry containing the ungelatinized starch starting material, an alkaline agent, and propylene oxide in a liquid medium comprising a $C_1$–$C_3$ alkanol and water, preferably less than 10% water by weight of the medium including the water in the starch. The reaction slurry is heated to a temperature of above about 100° C., and preferably to a temperature of about 145° to about 175° C., under autogenic pressure for a period of time ranging from about 1 minute to about 1 hour. The heating process can be conducted in a sealed vessel (batch process) or by passing the reaction slurry through a heated confined zone at a rate calculated to give the required residence time for the slurry in the heated zone (continuous or semicontinuous process). Applicant has found that when the process is conducted within the most preferred temperature range of about 145° to about 175° C., the hydroxypropylation reaction is complete in less than 30 minutes.

The reaction slurry is prepared by (1) suspending the ungelatinized starch starting material in about 1 to about 3 parts by weight of $C_1$–$C_3$ alcohol; (2) optionally sparging the alcoholic starch slurry with nitrogen to remove or minimize the amount of dissolved oxygen in the slurry; (3) adding an alkali metal hydroxide (preferably sodium hydroxide or potassium hydroxide or an equivalent thereof) either as pellets or flakes or in concentrated aqueous or alcoholic solution; and (4) adding propylene oxide in an amount sufficient to give the desired hydroxypropyl substitution levels in the starch product. The nitrogen sparging step helps to minimize discoloration of the starch during processing.

The alcohol which serves as the major component of the reaction slurry can be methanol, ethanol, propanol, or isopropanol. Ethanol is preferred. Some proportion of water is also desirable in the reaction slurry. The amount of water in the slurry, however, must be below that which would cause gelatinization of the hydroxypropylated product starch under the reaction conditions of the process. The maximum amount of water which should be added to the reaction mixture depends primarily on the substitution level of the hydroxypropylated starch product, the temperature at which hydroxypropylation reaction is conducted, the moisture level of the ungelatinized starch starting material, the form in which the alkaline catalyst is added (that is pellets or flakes opposed to concentrated aqueous solution) and to some extent the alcohol used as the processing medium. Generally where the hydroxypropylated starch product will have a level of substitution such that the product will have a pasting temperature below about 60° C. the reaction slurry should contain less than about 10% by weight water including the water in the starch. Where the granular starch starting material has a water content between about 8 and about 12% by weight, and where the alkaline reagent is added as an aqueous solution, additional water need not be added to the reaction slurry. Applicant has found that the present process is most efficient at the preferred reaction temperatures where the total water content, including the water in the ungelatinized starch starting material, is within a range of about 2 to about 5% by weight of the slurry. A water content of less than about 5% by weight of the slurry is particularly preferred, too, where the ungelatinized starch starting material contains phosphate ester cross-linkages which are more labile under the process conditions at the higher water levels.

The reaction slurry is rendered alkaline by the addition of an alkaline reagent which is substantially soluble in the liquid phase of the reaction slurry. Preferred alkaline reagents are alkali metal hydroxides, especially sodium hydroxide or potassium hydroxide or equivalents thereof. As mentioned above the alkaline reagent can be added as a solid, such as pellets or flakes, or in concentrated aqueous or alcoholic solution. Typically from about 1 to about 3% by weight of the starch (dsb) of the alkaline reagent is added to the reaction slurry. When sodium or potassium hydroxide is used as the alkaline reagent, applicant has found that the present hydroxypropylation reaction is most efficient when the alkali metal hydroxide is added in an amount equal to about 1.5 to about 2.5% of the weight of starch, dsb. In a most preferred embodiment of the present hydroxypropylation process an alkali metal hydroxide is utilized in the reaction slurry at a rate of about 1.8% of weight of the starch, dsb.

The hydroxypropylating agent is propylene oxide. The amount of propylene oxide used to carry out this process depends primarily on the desired level of hydroxypropylation of the product reduced-pasting-temperature starch and, as the skilled practitioner will recognize, the efficiency of the hydroxypropylation process under the present conditions.

The reaction of the present hydroxypropylation process, that is the ratio of hydroxypropyl in the starch product to that added to the reaction slurry as propylene oxide depends to some degree on the specific reaction conditions employed, especially time, temperature, water content of the slurry, and degree of alkalinity. Applicant has found that under the preferred conditions hydroxypropylation proceeds at efficiencies ranging from about 40 to about 70%. The amount of propylene oxide needed to effect the desired level of hydroxypropylation of the ungelatinized granular starch starting material can be estimated using the 40 to 70% efficiency figures and thereafter adjusted in accordance with actual efficiencies measured under the specific conditions used for the hydroxypropylation process.

The present process can be conducted at reaction temperatures ranging from about 100° to about 180° C. (or about 210° to about 360° F.) and preferably at temperatures between about 145° and 175° C. (about 290° to about 350° F.). Because the reaction temperatures are far in excess of the boiling point of the liquid medium, the process must be conducted in a closed vessel or otherwise under pressure sufficient to keep the medium in the liquid state at the reaction temperatures.

The time required to complete the present process depends of course on other process parameters such as the reaction temperature, starch concentration, time, the amount of propylene oxide in the reaction mixture, and the desired level of hydroxypropylation of the reduced-pasting-temperature-granular starch product. The reaction time can range anywhere from less than 1 minute up to about 1 hour. Over the preferred temperature range of about 145° to about 175° C., reaction time can range from under 5 minutes to about 30 minutes.

While the starch products can be left in the alkaline state it is preferred that they be neutralized with acid. After the heating step the starch slurry is usually cooled to below about 150° F. and then treated with a neutralizing amount of an acid, for example, glacial acetic acid. Enough acid should be added to the reaction mixture so that a 50-ml aliquot of the slurry in a 150-ml of distilled water at room temperature will have a pH of about 4.5–5. Because diffusion of alkali from the processed starch granules into the alcohol medium is slow, the reaction slurry is typically stirred following addition of the acid for a period of about 15 minutes to about 60 minutes. The time required to complete the starch neutralization process can be minimized by warming the neutralized reaction medium.

The reduced-pasting-temperature granular starch product is separated from the liquid medium component of the reaction slurry by filtration or centrifugation, washed with one or more volumes of the alcohol used in the process (or a mixture of that alcohol and water) and then dried or desolventized by conventional methods. For example, the starch can be dried in an oven to a certain volatiles level and then contacted with a hot humid gas, preferably moist air, while the starch is maintained at a temperature from about 140° to about 250° F.

The reduced-pasting-temperature granular starch products of the present invention have, by reason of their method of preparation a reduced fat content. Unprocessed granular starches typically have a native fat content ranging from about 0.4 to about 0.6% by weight. Under the conditions of the present hydroxypropylation process the fat content of the processed starch materials is reduced to below 0.25% and often below about 0.15%.

The reduced-pasting-temperature starches of the present invention can be used in the same manner and in the same applications as the reduced-pasting-temperature starches which have been known in the art. However, because the present starches require lower levels of substitution to achieve desired reductions in pasting temperature, the present reduced pasting temperature starches find particular advantage as thickening agents in quick cooling food preparations. Foods or food compositions that have been prepared utilizing reduced-pasting-temperature starches which have been available in the art can now be prepared with the present reduced-pasting-temperature starches which have a level of chemical substitution ranging from about 50 to about 75% the level of substitution of the prior art starches having comparable reduced pasting temperatures.

The present reduced-pasting-temperature starches can have pasting temperatures ranging as high as 60° C. down to temperatures below about 20° C., that is, low enough that the starches are considered cold-water pasting. Preferred reduced pasting temperature starches of the present invention have pasting temperatures from about 60° to about 40° C. Such preferred starches can be readily dispersed with minimal agitation in water with other food ingredients at a temperature below their pasting temperature and then develop, with heating, a viscosity equivalent to that obtainable by unmodified starches, however, at substantially lower cooking temperatures. Exemplary of such food applications are starch thickened instant gravy mixes, cream soups and cocoa breakfast drink mixes. The present starches also find application in frozen food compositions which are specifically formulated for microwave cooking.

The starches of the present invention which have HP substitution levels in excess of about 7% HP (0.21 D.S.) and pasting temperatures below about 20° C. produce a smooth, homogenous paste when dispersed in cold water. These pastes are similar to those obtained on cooking glutenous starches such as tapioca starch or a waxy maize starch at temperatures above their normal gelatinization temperature. Such higher HP starches of the present invention, as are the cold-water-swelling hydroxypropylated granular starches of the prior art, are useful as thickeners or adhesives in various commercial applications, for example, well drilling fluids, printing pastes, water-based paints, wallpaper adhesives, textile paper sizes, etc.

The following examples are provided to more fully illustrate the various composition and process embodiments of the present invention, and more particularly to illustrate the differences between the present reduced-pasting-temperature starches and reduced-pasting-temperature starches prepared by hydroxypropylation of granular starch materials in accordance with procedures which have been described in the art. Preparations I–IV describe the procedures used to prepare the hydroxypropylated starches represented by circled data points D, E, F and G, respectively in FIG. 1. Examples 1–3 are descriptions of the procedures used, in accordance with the present invention, to prepare the HP granular starches, having the characteristics designated by the circled data points A, B and C, respectively in FIG. 1.

The pasting temperatures reported in each of the following preparations and examples were determined using a Brabender VISCO/AMYLO/GRAPH with the starch at 6% by weight in a pH 6.5 buffer. The buffer is prepared by adding 150 ml of distilled water to 0.8 gm of methyl p-hydroxybenzoate and 0.2 gm of propyl p-hydroxybenzoate in a 250-ml beaker. The mixture is heated to boiling to dissolve the solids and then added to 700 ml of distilled water in a one-liter graduated cylinder. Distilled water is added to bring the volume to one liter. The solution is transferred to a beaker and the following solids added: 10.0 gm anhydrous dibasic sodium phosphate, 10.0 gm sodium chloride, 2.0 gm sodium benzoate, and 2.7 gm granular citric acid ($C_6H_8O_7 \cdot H_2O$). When the solids are all dissolved, the pH is adjusted to 6.5 using a pH meter by adding either citric acid, if the pH is more than 6.5, or dibasic sodium phosphate if the pH is less than 6.5.

In conducting the pasting temperature determination the starch slurry is placed in a sample bowl which itself is in an electrically heated air bath. A cold finger projects into the bowl. Heating and cooling are controlled by mechanically operated thermal regulator which increases or decreases the temperature at a constant rate of 1.5° C. per minute. Viscosity of the starch slurry is recorded with time continuously on a strip chart recorder. The thermal regulator is set at 35° C. initially. The temperature of the starch slurry is increased at a rate of 1.5° C. per minute during the course of the test. The time in minutes at which the pen of the chart recorder leaves the Zero Brabender unit line is recorded and the pasting temperature is calculated according to the following formula: Pasting temperature, °C. = 35 + (1.5 × minutes).

The hydroxypropyl substitution level of each of the hydroxypropylated granular starches prepared in the following PREPARATIONS and EXAMPLES were measured using an Auto-Analyzer equipped with 420 nm filters, and an 8 mm N-type flow-cell. The method measures the beta-d-glucose produced by the acid hydrolysis of hydroxypropylated starch. The beta-d-glucose is converted, by specific catalytic action of glucose oxidase to hydrogen peroxide which when reacted with potassium ferric cyanide in the presence of horseradish peroxidase yields the oxidized ferricyanide ion. The peroxide reactions are performed in a pH 7 buffered system to minimize amylase and maltase activity. The absorbence of the resulting ferricyanide solution is measured at 420 nm during passage through at flow cell. Any material present in the sample which is not converted to beta-d-glucose by acid hydrolysis is measured as hydroxypropyl substituted.

The reagents required for conducting the analysis for hydroxypropyl content of granular starch materials are as follows:

1. Hydrochloric acid (approximately 1N): dilute 83 ml concentrated HCl to one liter with distilled water.
2. Phenolphthalein indicator: dissolve 1 gm phenolphthalein powder in 60 ml 3A alcohol and dilute to 100 ml with distilled water.
3. Sodium hydroxide (approximately 2N): dissolve 80 gm sodium hydroxide pellets in 500 ml distilled water, cool, and dilute to one liter with distilled water.
4. Tris buffer (0.5N pH 7.0): dissolve 60.5 gm Tris (hydroxymethyl) amino methane (THAM) in 600 ml of distilled water. Adjust the pH to 7 with concentrated hydrochloric acid, about 35 ml being required. Dilute to one liter with distilled water.
5. Detergent Stock solution (5%): weigh 50 gm of Brij 35 (polyoxyethylene 23 lauryl ether), dissolve and dilute to one liter with distilled water. If the solution becomes cloudy upon standing, filter through a coarse porocity sintered glass filter.
6. Sodium chloride (0.9%): dissolve 9.0 gm reagent grade sodium chloride in 600 ml of distilled water. Add 20 ml detergent stock solution and dilute to one liter with distilled water.
7. Wash solution: add 20 ml of detergent stock solution to 980 ml distilled water and mix.
8. Di-enzyme solution: in a one liter volumetric flask dissolve 20 gm of potassium ferrocyanide in 500 ml Tris-buffer. To this add 50 ml of Fermocozyme 952 DM and dilute to volume with Tris-buffer. Filter the solution through a coarse porocity sintered glass filter under vacuum. Store in an amber glass bottle and refrigerate when not in use.
9. Dextrose Standard (600 mg/100 ml): accurately weigh 3.000 gm of anhydrous dextrose and quantitatively transfer to a 500 ml volumetric flask. Dissolve and bring to volume with a saturated solution of benzoic acid in distilled water. Allow at least 6 hours for mutarotation to reach equilibrium before using.

Apparatus:
1. Autoclave: operated at 105° C. and 6 psi.
2. Kohlrausch flask: 100-ml volumetric.
3. Auto-Analyzer.

Procedure:
1. Determine the moisture and ash on both the standard and sample by an acceptable method.
2. Weigh accurately, 600 mg of the starch standard into a 100-ml Kohlrausch flask.
3. Weigh accurately 600 mg of hydroxypropylated sample starch into a 100-ml Kohlrausch flask (the preferred standard starch is the non-modified starch of the same lot used for the production of hydroxypropylated starch). For a more precise estimation of the hydroxypropyl content of the sample, the moisture and ash content of the sample and the standard starch should be corrected for prior to calculating the results.
4. Add 40 ml 1N. hydrochloric acid to each flask.
5. Hydrolyze the standard and sample in an autoclave at 105° C. for 15 minutes, 6 psi (both the sample and the standard must be autoclaved simultaneously to assure duplicate time, temperature and pressure for both).
6. Cool the samples below room temperature and add 2 drops of phenophthalein indicator.
7. Neutralize to the phenophthalein end-point by the addition of 2N sodium hydroxide (about 20 ml usually required).
8. Dilute samples to 100 ml volume with pH 7 Tris-buffer.
9. Place the samples and starch standards on the Auto-Analyzer turn-table in the repetitive sequence of 1 dextrose standard followed by four samples. All subsequent operations are performed by the Auto-Analyzer.

Calculations:

Record the absorbence of the samples of starch and dextrose standards.

Calculate the mg dextrose in the sample and starch standard by comparison to the nearest dextrose standard.

$$\text{mg dextrose} = \frac{\text{(Dextrose standard)} \times \text{(absorbence of sample)}}{\text{Absorbence of Standard (dextrose)}}$$

Calculate the conversion factor of starch standard to dextrose.

$$\text{Conversion factor } (CF) = \frac{\text{mg starch } (dsb)}{\text{mg dextrose}}$$

% hydroxypropyl (% HP) =

$$\frac{[(\text{mg starch}) - (\text{mg dextrose} \times CF)] \times 100 \times .2670}{\text{mg starch}}$$

PREPARATION I

Hydroxypropylation of Common Corn Starch According to Procedure of U.S. Pat. No. 2,845,417

A slurry was prepared by mixing 2,000 gm of ungelatinized corn starch in 1,330 gm of 3A ethanol with 60 gm of sodium hydroxide, 70 gm of water and 200 gm of propylene oxide. The reaction slurry was heated to 130° F. (47° C.). Samples were taken from the reaction slurry after 5 hours and 24 hours at 130° F. Each sample was neutralized with acetic acid, diluted with water, filtered, and washed with 3A ethanol and dried. The hydroxypropylated starch products had hydroxypropyl substitution levels of 2.6% and 5.4% by weight and exhibited Brabender pasting temperatures of 64.0° and 49.5° C. respectively.

In a separate preparation of hydroxypropylated granular starch in accordance with procedures of U.S. Pat. No. 2,845,417 a slurry comprised of 1,000 gm (890 gm, dsb) of ungelatinized, unmodified corn starch in a mixture of 3,000 gm of 3A ethanol, 16 gm of sodium hydroxide in 175 ml of water and 120 gm of propylene oxide, was heated at 130° F. for 23 hours. The reaction mixture was neutralized with acetic acid, filtered, washed with aqueous 3A ethanol and dried. The hydroxypropylated granular starch product was found to have a hydroxypropyl substitution level of 2.5% by weight, and it exhibited a Brabender pasting temperature of 64.0° C.

PREPARATION II

Hydroxypropylation of Granular Starch in Accordance With the Procedures Described in U.S. Pat. No. 2,516,634

A slurry of 1800 gm (1620 gm, dsb) of ungelatinized corn starch in 3200 ml of a water solution containing 5 gm of sodium hydroxide and 40 gm of sodium chloride was mixed thoroughly. The slurry was filtered and the damp (unwashed) filter cake was dried. Each of 4 polymer bottles was charged with 334 grams of the dried starch product and propylene oxide in the amount (% based on weight of starch, dsb) indicated in the tabulated results below, and then sealed. After the starch and propylene oxide mixture was thoroughly blended to assure a homogeneous mixture, the sealed bottles were placed in an oven at 180° F. (81° C.) overnight.

The starch products obtained using propylene oxide at 6, 8, 10 and 12% by weight of starch (dsb) in the dry reaction mixture were analyzed for percent HP [moisture free basis (mfb) and ash free basis (afb)] and pasting temperature. The results are presented in tabular form below:

| PREPARATION II RESULTS | | | |
|---|---|---|---|
| Bottle | Propylene Oxide % | % HP (mfb/afb) | Pasting Temp. (°C.) |
| 1 | 6 | 4.1 | 59.0 |
| 2 | 8 | 4.8 | 54.5 |
| 3 | 10 | 6.0 | 49.0 |
| 4 | 12 | 6.9 | 44.0 |

PREPARATION III

Hydroxypropylation of Cross-Linked Waxy Maize By the Method Described in U.S. Pat. No. 2,845,417

Propylene oxide (200 gm) was added to a slurry of 2,000 gm of a cross-linked granular waxy maize starch in 1,430 gm of 3A ethanol containing 50 gm of sodium hydroxide and 70 gm of water. The reaction mixture was heated to 130° F. (47° C.) and stirred at that temperature overnight. After a total reaction time of 24 hours, the mixture was diluted with 100 ml of 3A ethanol, neutralized with acetic acid, and filtered. The starch product cake was washed with 300 ml of 3A ethanol and dried. Analysis of the starch product gave the following results:

Moisture and volatiles—5.18%
Ash—3.18%
% HP—6.7%
Pasting Temperature—49° C.

PREPARATION IV

Hydroxypropylation of Granular Corn Starch by Conventional Aqueous Process

A slurry of 1657 gm (1500 gm, dsb) of unmodified granular corn starch and 150 gm of propylene oxide in a solution of 150 gm of sodium sulfate and 15 gm sodium hydroxide in 2200 gm of water was heated at 110° F. (43° C.) overnight. Product samples were removed from the reaction mixture after 4 hours and 22 hours. Each sample was neutralized with acetic acid, filtered, washed, and dried. Analysis of the dried hydroxypropylated starch samples provided the following results:

| PREPARATION IV RESULTS | | | | |
|---|---|---|---|---|
| Reaction Time | Moisture and Volatiles | Ash | % H P | Pasting Temperature |
| 4 hours | 3.77% | 2.1% | 2.0 | 70.0° C. |
| 22 hours | 3.84% | 3.3% | 5.5 | 61.5° C. |

PREPARATION V

Hydroxypropylated Tapioca Starch by Conventional Aqueous Process

A slurry containing 4500 gm, dsb of granular tapioca starch in a solution of 360 gm of sodium sulfate in 5,220 ml of tap water, 45 gm sodium hydroxide as a 5% solution, and 315 gm of propylene oxide was heated to 100°-102° F. overnight. The hydroxypropylated tapioca starch product was filtered, washed with water and dried. The starch product had a hydroxypropyl substitution level 3.7% by weight and a pasting temperature of 64° C.

EXAMPLE 1

In a stirred pressure-tight vessel a slurry of 1340 gm (1200 gm, dsb) of tapioca starch in 4,000 gm 3A ethanol with 20 gm of sodium hydroxide, 200 gm of water and 96 gm of propylene oxide was heated to 320° F. (160° C.). Samples were removed after 2.5, 5.0 and 10 minutes. Each starch slurry sample was neutralized with acetic acid, filtered, washed with 3A ethanol and dried. The same process was repeated with sampling after 10, 20 and 40 minutes. Analytical results on the hydroxypropylated tapioca starch products are presented in Table I.

TABLE I
EXAMPLE 1 RESULTS

| Reaction Time (min.) | Pasting Temperature (°C.) | Hydroxypropyl (%) |
|---|---|---|
| 2.5 | 61.5 | 1.6 |
| 5.0 | 56.5 | 2.2 |
| 10.0 | 50.5 | 2.8 |
| 10.0 | 50.5 | 2.9 |
| 20.0 | 42.5 | 4.0 |
| 40.0 | 38.5 | 4.4 |
| Tapioca starch starting material | 73.0 | 0 |

EXAMPLE 2

Propylene oxide (800 gm) was blended into a slurry of 8,950 gm (8,000 gm, dsb) of cross-linked waxy maize starch in 15,200 gm of 3A ethanol containing 144 gm of sodium hydroxide and 150 gm of water. The slurry was pumped through a laboratory shell and tube reactor heated to 334°-336° F. (168° C.) at a rate sufficient to give the slurry a residence time of 4.75 minutes in the reactor. The reaction slurry was passed through a cooling coil heat exchanger and then vented to the atmosphere at a temperature of about 80° to about 90° F. The starch slurry was neutralized with 520 ml of glacial acetic acid. The product was centrifuged, washed with an approximately equal volume of 3A ethanol and dried. The resulting hydroxypropylated, cross-linked, granular waxy maize starch had a hydroxypropyl content of 4.1% and a pasting temperature of 38.5° C. The cross-linked waxy maize starch starting material for the above process had a pasting temperature of 76° C.

To determine the effects of variations in starch concentration, relative amounts of propylene oxide and sodium hydroxide and variations in temperature and reaction time, a series of experiments were performed studying the hydroxypropylation of cross-linked waxy maize starch in ethanol. The process variables and the analytical results on the starch products are summarized in Table II. Each of the experiments were conducted as follows:

The starch starting material was slurried in 3A ethanol. Before the sodium hydroxide was added, the slurry was sparged with nitrogen to minimize production of color in the product during the high temperature processing. Following the nitrogen sparging step, the sodium hydroxide was added in an aqueous alcohol solution. Additional water was added if needed. Propylene oxide, ranging from about 3% to about 10% by weight based on the starch, dsb, was added to the alkaline alcoholic slurry in one portion. The slurry was heated in a sealed vessel to temperatures ranging from about 115° to about 165° C. for times ranging from 1 minute to 60 minutes, and then cooled to 60° to 70° C. before about 2.3 to about 2.5 moles of glacial acetic acid was added for each mole of sodium hydroxide used in the reaction mixture. Thereafter the reaction slurry was cooled to about 20° to about 30° C. The product starch was isolated by centrifugation or filtration, washed with aqueous ethanol, and dried.

TABLE II
Hydroxypropylated Crosslinked Waxy Maize Starch by Batch Process

| | Reaction Conditions | | | | | Starch Characteristics | |
|---|---|---|---|---|---|---|---|
| % Starch* | % Alcohol** | % P.O | % NaOH | Temp. (°C.) | Time | Pasting Temp. (°C.) | % HP |
| 40.8 | 90.8 | 5 | 2 | 122.5 | 15 | 63 | 1.85 |
| 40.8 | 90.8 | 5 | 2 | 128.5 | 60 | 53 | 2.69 |
| 39.3 | 97.2 | 10 | 2 | 142.5 | 5 | 55 | 1.4 |
| 39.3 | 97.2 | 10 | 2 | 142.5 | 10 | 44 | 1.8 |
| 39.3 | 97.2 | 10 | 2 | 142.5 | 20 | 33 | 2.1 |
| 39.5 | 88.2 | 10 | 2 | 152.5 | 10 | 37 | 4.8 |
| 37.5 | 90.1 | 10 | 2 | 161.5 | 3 | 42 | 4.3 |
| 30.0 | 97.2 | 10 | 3 | 115.0 | 60 | 50 | 1.6 |
| 20.0 | 97.2 | 3 | 3 | 140 | 10 | 67 | .2 |
| 20.0 | 80.0 | 8 | 3 | 115.0 | 10 | 67 | .3 |
| 20.0 | 97.2 | 5 | 0.5 | 115.0 | 40 | 71 | .3 |
| 20.0 | 88.0 | 10 | 0.5 | 115.0 | 1 | 75 | 1.6 |
| 30.0 | 97.2 | 3 | 1 | 115.0 | 1 | 75 | 1.7 |
| 40.0 | 97.2 | 10 | 0.5 | 165.0 | 1 | 60.5 | .8 |
| 40.8 | 93.0 | 3 | 3 | 165.0 | 60 | 54 | 1.9 |
| 40.8 | 80.0 | 3 | 2 | 65 | 1 | 60.5 | 1.2 |
| 30.0 | 97.2 | 10 | 0.5 | 140.0 | 60 | 46 | 1.8 |

*Starch, dsb based on total of starch, alcohol and water only.
**Alcohol based on alcohol and water (from all sources).

EXAMPLE 3

A starch slurry was prepared by adding 6,690 gm (6,000 gm, dsb) of corn starch to 11,000 gm of 3A ethanol. The slurry was sparged with nitrogen. A solution of 125 gm of sodium hydroxide in 175 gm water and 1,000 gm of 3A ethanol was added, and thereafter 600 gm of propylene oxide were blended into the slurry. The reaction slurry was pumped through a shell and tube reactor heated to 320° to 325° F. (160°-162° C.) at a rate to give the slurry a 10 minute residence time in the heated reactor. The slurry was neutralized to pH 4.5 with 200 ml of acetic acid and divided into two equal parts. Each part was diluted with 2,000 ml of water, stirred 30 minutes and then diluted again with 1 gallon of 3A ethanol. The starch product was centrifuged, washed with 3A ethanol and dried. Analysis of the hydroxypropylated product was as follows:

| Moisture and Volatiles | 3.96% |
|---|---|
| Ash | 1.38% |
| Percent HP | 3.1% (dsb) |
| Pasting Temperature | 40.0° C. |

The following examples designated examples 3 (a) through 3 (f), describe additional experiments where granular corn starch was hydroxypropylated in accordance with the present invention. The analytical results obtained on the starch products from those experiments is summarized in Table III below.

(a) A starch slurry containing 1700 gm (1500 gm, dsb) of pearl corn starch in 3600 gm of 3A ethanol with 200 gm water, 27 gm of sodium hydroxide and 150 gm of propylene oxide was heated to 340° F. (171° C.) for 5 minutes and cooled to room temperature. The reaction slurry was neutralized with 80 mls glacial acetic acid. The product starch was filtered, washed with 3A ethanol and dried.

(b) A starch slurry containing 1680 gm (1500 gm, dsb) of pearl corn starch in 3,000 gm of 3A ethanol was sparged with nitrogen. Thereafter a solution of 25 gm sodium hydroxide in 100 ml of water and 100 ml of 3A ethanol was added. Finally propylene oxide (150 gm) was added to the slurry. The mixture was heated at 325°–330° F. (163°–165° C.) for 10 minutes, cooled to 150° F. and neutralized with 75 ml of acetic acid. The reaction mixture was cooled to room temperature, and the starch product was centrifuged, washed with 3A ethanol and dried at 80° C.

(c) A starch slurry of 1680 gm (1500 gm, dsb) of pearl corn starch in 3500 gm of 3A ethanol was sparged with nitrogen. Thereafter 15 gm sodium hydroxide in 100 ml water and 100 ml 3A ethanol were added followed by 150 gm of propylene oxide. The mixture was heated to 325° F. (163° C.) for ten minutes and cooled to 140° F. at which temperature 45 ml of acetic acid was added. The cooling of the reaction slurry was continued to room temperature where the starch product was centrifuged from the slurry, washed with 3A ethanol and dried.

(d) A slurry of 2,230 gm (2,000 gm, dsb) of corn starch in 3500 gm 3A ethanol with 36 gm sodium hydroxide and 100 ml water was sparged for 15 minutes with nitrogen. Thereafter 200 gm of propylene oxide were added. The mixture was then heated to 330° F. (165° C.) for five minutes, cooled to room temperature, and then diluted with 900 ml of water. To the diluted slurry was added 0.25 ml of phosphorous oxychloride. The reaction mixture was stirred for 2 hours at room temperature and then neutralized by the addition of 125 ml of acetic acid. After stirring the neutralized reaction medium for 30 minutes, the starch product was centrifuged from the reaction slurry, washed with 3A ethanol and dried.

(e) A starch slurry containing 6,690 gm (6,000 gm, dsb) of pearl corn starch in 12,000 gm of 3A ethanol, 108 gm sodium hydroxide, 300 gm water and 600 gm propylene oxide was pumped through a shell and tube reactor, heated to 322° F. (161° C.) at a flow rate calculated to provide a residence time for the slurry in the reactor of about 2½ minutes. Reacted starch slurry was collected in two 5-gallon pails and after settling was decanted to a total weight of 15,535 gm (2.59 gm of slurry for each gram of starting starch). A 6,735 gram-portion (2600 gm, dsb starch) was diluted with a mixture of 2100 gm 3A ethanol and 1500 gm water. To the slurry was added 0.7 ml of phosphorous oxychloride. The slurry was stirred for one hour at 72° F. and thereafter neutralized by the addition of 140 ml of acetic acid. After the neutralized reaction slurry was stirred for 1.5 hours, the starch product was filtered, washed with 50% aqueous 3A ethanol and dried.

(f) A starch slurry containing 2,230 gm (2,000 gm, dsb) of pearl corn starch in 3,000 gm of 3A ethanol with 36 gm sodium hydroxide, 100 ml water and 200 gm propylene oxide was heated to 325° F. (163° C.) for 5 minutes and thereafter cooled to room temperature. To reaction slurry was then added 700 ml water and 1 ml phosphorous oxychloride. After 2 hours at room temperature, 500 ml water and 150 ml of glacial acetic acid were added. The resulting slurry was stirred for 30 minutes and then allowed to stand overnight. The starch product was filtered, washed with 3A ethanol and dried.

TABLE III

| Starch | | % HP | Pasting Temperature (°C.) |
|---|---|---|---|
| Example 3 | (a) | 4.0 | 46 |
| | (b) | 4.8 | 38 |
| | (c) | 2.8 | 51.5 |
| | (d) | 4.2 | 43.5 |
| | (e) | 2.0 | 59 |
| | (f) | 3.9 | 47.5 |

EXAMPLE 4

A slurry of 1376 gm (1200 gm, dsb) of a granular cross-linked waxy maize starch in 4,000 gm of 3A ethanol, 22 gm of sodium hydroxide in 25 gm water, and 120 gm of propylene oxide was heated at 350° F. (178° C.) in a sealed reactor for 12 minutes and then cooled to room temperature. The reaction slurry was neutralized by adding 75 ml of acetic acid and warming to about 175° F. (80° C.). The reaction mixture was then cooled and the starch product was filtered, washed with 3A ethanol and dried. Analysis of the starch product gave the following results:
Moisture and volatiles—3.34%
Ash—2.58%
Percent HP—5.5% (mfb/afb)
Pasting Temperature—less than 10° C.

EXAMPLE 5

A slurry of 2830 gm (2500 gm, dsb) of waxy maize starch in 4400 gm of anhydrous 3A ethanol, 100 gm of 50% aqueous sodium hydroxide and 375 gm of propylene oxide was prepared and then pumped through a reactor heated to 310°–315° F. (155°–157° C.) at a rate to provide a residence time of the slurry in the heated zone of about 50 seconds. The slurry was cooled and neutralized with glacial acetic acid, and the starch product was filtered and washed with 80% aqueous 35A ethanol and dried. The starch product was found to have a hydroxypropyl substitution level of 4.21% and a Brabender pasting temperature of 47° C.

EXAMPLE 6

A solution prepared by mixing 286 pounds of 3A ethanol, and 3.6 pounds of 50° Be' sodium hydroxide was purged with nitrogen for 20 minutes. Thereafter 100 pounds (dsb) of a cross-linked dent corn starch was added, and the resulting slurry was again purged with nitrogen for 20 minutes. Ten pounds of propylene oxide were then introduced and blended into the slurry. The reaction slurry was pumped through a shell and tube reactor heated to 345°–350° F. (174°–176° C.) (325 psig outlet pressure) at a rate to give a total residence time for the slurry in the reactor of 14.4 minutes. After heat processing, the slurry was cooled to below 160° F. (71° C.) and then neutralized by the addition of 6.8 pounds of glacial acetic acid. The starch product was separated from the reaction slurry by centrifugation, washed with 3A ethanol and dried to a maximum moisture and volatile content of 4% by weight. The reduced-pasting-temperature cross-linked, hydroxypropylated granular starch product has a hydroxypropyl substitution level of 4.0 to 5.0%, dsb and a pasting temperature typically in the range of about 40° to about 45° C.

We claim:

1. An improved hydroxypropyl substituted granular starch characterized by (1) a hydroxypropyl substitution level of about 2 to about 9% by weight of starch (dsb), and (2) a pasting temperature reduced from that of the granular starch before hydroxypropyl substitution by at least 6.5° C. for each 1% by weight of hydroxypropyl substitution.

2. The hydroxypropyl substituted granular starch according to claim 1 wherein the granular starch is corn starch.

3. The hydroxypropyl substituted starch of claim 1 characterized by a pasting temperature of about 20° to about 60° C.

4. The hydroxypropyl substituted granular starch of claim 1 wherein the granular starch is a cross-linked waxy maize starch.

5. The hydroxypropyl substituted cross-linked waxy maize starch of claim 4 characterized by a pasting temperature reduced from that of the cross-linked waxy maize starch before hydroxypropyl substitution by at least 7° C. for each 1% by weight of hydroxypropyl substitution.

6. The hydroxypropyl substituted starch of claim 5 characterized by a pasting temperature of about 20° to about 60° C.

7. The hydroxypropyl substituted granular starch of claim 1 wherein the granular starch is tapioca starch.

8. The hydroxypropyl substituted tapioca starch of claim 7 characterized by a pasting temperature reduced from that of the tapioca starch before hydroxypropyl substitution by at least 7° C. for each 1% by weight of hydroxypropyl substitution.

9. The hydroxypropyl substituted starch of claim 8 characterized by a pasting temperature of about 20° to about 60° C.

10. A process for preparing an improved hydroxypropyl substituted granular starch characterized by (1) a hydroxypropyl substitution level of about 2 to about 9% by weight of starch (dsb), and (2) a pasting temperature reduced from that of the granular starch before hydroxypropyl substitution by at least 6.5° C. for each 1% by weight of hydroxypropyl substitution, which process comprises reacting ungelatinized granular starch slurried in a liquid medium comprising a $C_1$–$C_3$ alkanol and water, at a level of less than 10% of the liquid medium with propylene oxide under alkaline conditions in a confined zone at a reaction temperature above about 100° C. provided that the water content of the starch slurry, including the water in the starch, is insufficient to swell the granular starch under the reaction conditions.

11. The process of claim 10 wherein the reaction with propylene oxide is conducted at a temperature between about 100° and 180° C.

12. The process of claim 11 wherein the alkaline conditions are achieved by adding about 1% to about 3% by weight, based on weight of granular starch (dsb), of sodium hydroxide or potassium hydroxide to the liquid medium.

13. The process of claim 12 wherein the liquid medium is comprised of ethanol and water, and the water content of the starch slurry, including the water in the starch, is about 2 to about 5% by weight of the slurry.

14. The process of claim 13, said process being conducted as a continuous process by passing the alkaline slurry containing the granular starch and propylene oxide through a heated reactor.

15. The process of claim 14 wherein the reaction temperature is between about 145° and about 175° C.

16. The process of claim 15 wherein the rate at which the liquid medium is passed through the heated reactor is such that the residence time in the heated reactor is about 2 to about 30 minutes.

17. An improved hydroxypropyl substituted granular starch prepared by the process comprising reacting ungelatinized granular starch slurried in a liquid medium comprising a $C_1$–$C_3$ alkanol and water, at a level of less than 10% of the liquid medium with propylene oxide under alkaline conditions in a confined zone at a reaction temperature above about 100° C. provided that the water content of the starch slurry, including the water in the starch, is insufficient to swell the granular starch under the reaction conditions.

18. The hydroxypropyl substituted granular starch of claim 17 characterized by (1) a hydroxypropyl substitution level of about 2 to about 9% by weight of starch (dsb), and (2) a pasting temperature reduced from that of the granular starch before hydroxypropyl substitution by at least 6.5° C. for each 1% by weight of hydroxypropyl substitution.

19. The hydroxypropyl substituted granular starch according to claim 18 wherein the granular starch is corn starch.

20. The hydroxypropyl substituted starch of claim 18 characterized by a pasting temperature of about 20° to about 60° C.

21. The hydroxypropyl substituted granular starch of claim 18 wherein the granular starch is a cross-linked waxy maize starch.

22. The hydroxypropyl substituted cross-linked waxy maize starch of claim 21 characterized by a pasting temperature reduced from that of the cross-linked waxy maize starch before hydroxypropyl substitution by at least 7° C. for each 1% by weight of hydroxypropyl substitution.

23. The hydroxypropyl substituted starch of claim 22 characterized by a pasting temperature of about 20° to about 60° C.

24. The hydroxypropyl substituted granular starch of claim 18 wherein the granular starch is tapioca starch.

25. The hydroxypropyl substituted tapioca starch of claim 24 characterized by a pasting temperature reduced from that of the tapioca starch before hydroxypropyl substitution by at least 7° C. for each 1% by weight of hydroxypropyl substitution.

26. The hydroxypropyl substituted starch of claim 25 characterized by a pasting temperature of about 20° to about 60° C.

* * * * *